United States Patent
Shapira et al.

(10) Patent No.: US 9,569,500 B2
(45) Date of Patent: Feb. 14, 2017

(54) PROVIDING A CUSTOMIZABLE APPLICATION SEARCH

(71) Applicant: Quixey, Inc., Mountain View, CA (US)

(72) Inventors: Liron Shapira, Palo Alto, CA (US); Nicolas Tarleton, Daly City, CA (US)

(73) Assignee: Quixey, Inc., Mountain View, CA (US)

( * ) Notice: Subject to any disclaimer, the term of this patent is extended or adjusted under 35 U.S.C. 154(b) by 388 days.

(21) Appl. No.: 13/873,018

(22) Filed: Apr. 29, 2013

(65) Prior Publication Data

US 2013/0290321 A1    Oct. 31, 2013

Related U.S. Application Data

(60) Provisional application No. 61/639,222, filed on Apr. 27, 2012.

(51) Int. Cl.
*G06F 17/30* (2006.01)

(52) U.S. Cl.
CPC ..... *G06F 17/3053* (2013.01); *G06F 17/30321* (2013.01); *G06F 17/30522* (2013.01); *G06F 17/30554* (2013.01); *G06F 17/30864* (2013.01); *G06F 17/30867* (2013.01)

(58) Field of Classification Search
CPC .......... G06F 17/30867; G06F 17/30864; G06F 17/3053; G06F 17/30554; G06F 17/3002; G06F 17/30386; G06F 17/30477; G06F 17/30991; G06F 17/30112; G06F 17/30657; G06F 17/30699

USPC ................................... 707/705-780
See application file for complete search history.

(56) References Cited

U.S. PATENT DOCUMENTS

| | | | |
|---|---|---|---|
| 7,565,630 B1* | 7/2009 | Kamvar | G06F 17/30867 |
| 2010/0262619 A1* | 10/2010 | Zargahi | G06F 8/61 707/770 |
| 2011/0238482 A1* | 9/2011 | Carney | G06F 17/30867 705/14.36 |
| 2011/0320307 A1* | 12/2011 | Mehta | G06Q 30/0282 705/26.7 |
| 2012/0054178 A1* | 3/2012 | Tran | H04N 21/45 707/723 |
| 2012/0124061 A1* | 5/2012 | Macbeth | G06F 9/445 707/749 |
| 2012/0246150 A1* | 9/2012 | Comi | G06F 17/30289 707/722 |

(Continued)

*Primary Examiner* — Michelle Owyang
(74) *Attorney, Agent, or Firm* — Harness, Dickey & Pierce, PLC

(57) ABSTRACT

One embodiment of a disclosed method and computer-readable storage medium provides customizable application search. Partner systems leverage search functionality of an application search system configured to perform searches for applications. In one embodiment, partner systems select filters to be applied to queries submitted to the application search system via the partners' websites, and specify particular attributes to be displayed with each search result returned by the application search system. When users submit queries to the application search system via a partner system, the users' queries are associated with the partner system's custom filters and attribute display preferences. In response to receiving the queries, the application search system returns search results filtered and formatted according to the partner system's custom preferences.

8 Claims, 6 Drawing Sheets

(56) References Cited

U.S. PATENT DOCUMENTS

| | | | |
|---|---|---|---|
| 2012/0290441 A1* | 11/2012 | Mahaniok et al. ......... | 705/26.62 |
| 2012/0316955 A1* | 12/2012 | Panguluri et al. ......... | 705/14.41 |
| 2012/0323898 A1* | 12/2012 | Kumar .............. | G06F 17/30867 |
| | | | 707/723 |
| 2013/0091130 A1* | 4/2013 | Barrow ............. | G06F 17/30864 |
| | | | 707/723 |
| 2013/0166357 A1* | 6/2013 | Eggs ...................... | G06Q 30/01 |
| | | | 705/7.36 |

* cited by examiner

PROVIDING A CUSTOMIZABLE APPLICATION SEARCH

CROSS REFERENCE TO RELATED APPLICATION

This application claims the benefit of U.S. Provisional Application No. 61/639,222, filed Apr. 27, 2012, which is incorporated by reference in its entirety.

BACKGROUND

Field of Art

The disclosure generally relates to the field of application search, and more particularly to providing customizable application search.

Description of the Related Art

In recent years, use of computers, smartphones, and other Internet-connected devices has grown exponentially. Correspondingly, the number of available applications for such devices has also grown. Today, many diverse applications can be accessed on any number of different devices, including, but not limited to, smartphones, personal computers, refrigerators, automobiles, and televisions. These diverse applications can range from business driven applications, games, educational applications, news applications, shopping applications, efficiency applications, messaging applications, video chatting applications, media streaming applications, social networking applications, and so much more.

When users are searching for applications, they often know whether they are searching for a game, an efficiency application, a social networking application, or the like. However, current application search engines search all types of applications rather than leveraging the knowledge of the user or allowing the user to search only a subset of the available applications. Moreover, current application search engines do not support customization of the search results presented to end users.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed. It is noted that wherever practicable similar or like reference numbers may be used in the figures and may indicate similar or like functionality.

Configuration Overview

One embodiment of a disclosed method and computer-readable storage medium provides customizable application search via an application search system. As used herein, an application may refer to an object or entity that provides a core set of functionalities. In one aspect, to represent an application, the application search system employs an application representation structure. The application representation may include various application attributes associated with the application. Such application attributes may correspond to various aspects of an application, such as functional aspects, developer information, publisher information, title information, different variations or editions of the application, etc.

In one embodiment, the application search system provides application search functionality to one or more partners. To support application search, the application search system generates one or more indexes of application representations and their associated attributes. The partners may specify certain application attribute preferences, including an attributes filter and attribute display preferences to be applied to search results. An attributes filter may specify one or more application attributes by which search results are to be filtered (e.g., filter out applications having a low security rating from the search results). The attribute display preferences indicate application attributes of each application representation in search results to be displayed to end users. For example, the attribute display preferences may specify that reviews for applications retrieved from social networking websites are to be displayed to end users in search results.

System Architecture

Figure 1:
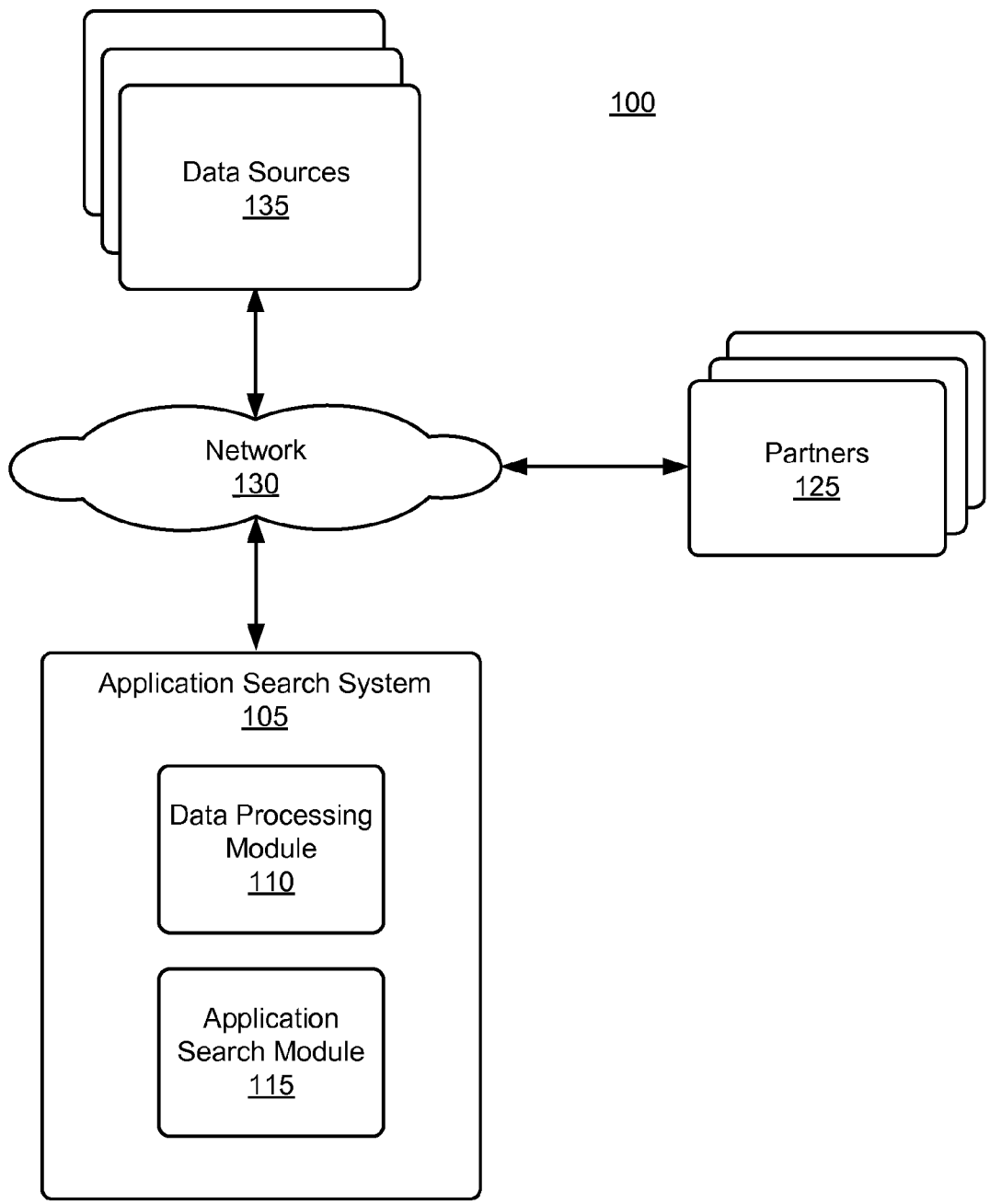
FIG. 1 illustrates an example environment for performing application search.

FIG. 1 is a high-level block diagram illustrating a typical environment 100 used for providing customizable application search, according to one embodiment. The operations described herein may be performed by one or more computing systems, such as computing system 100. Referring to FIG. 1, the environment 100 includes a network 130, one or more data sources 135, one or more partners 125, and an application search system 105. Each of the one or more data sources 135, one or more partners 125, and application search system 105 may be in communication with one another via the network 130. Only one application search system 105, three data sources 135, and three partners 125 are shown in FIG. 1 for purposes of clarity, but those of skill in the art will recognize that typical environments can have multiple data sources 135 and partners 125, and can also have multiple application search systems 105.

The network 130 enables communications between the various entities of the environment 100. In one embodiment, the network 130 uses standard communications technologies and/or protocols. Thus, the network 130 can include links using technologies such as Ethernet, Wireless Fidelity (WiFi) (e.g., 802.11), worldwide interoperability for microwave access (WiMAX), 3G, Long Term Evolution (LTE), digital subscriber line (DSL), asynchronous transfer mode (ATM), InfiniBand, PCI Express Advanced Switching, etc. Similarly, the networking protocols used on the network 130 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 130 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network 130 can also include links to other networks such as the Internet.

The data sources 135 provide data regarding one or more applications to the application search system 105. The data sources 135 may include any suitable data providers, including operators of application stores, application developers, application catalogs, websites (e.g., blogs, application review sites, etc.), and/or the like. In one embodiment, each data source 135 may have its own distinct interface, content, update rate, etc.

The partners 125 provide (via various machines and/or user devices, one or more of which comprise a partner system) search queries to the application search system 105 and receive search results based on the queries. As used herein, a partner 125 may be a third party entity (e.g., a company or other organization) or an end user that leverages the search functionality of the system 105. In some instances, a partner 125 may be a third party entity that leverages the search functionality of the system 105 via its own website or portal. For example, a partner 125 may display an application search bar on its website. The partner's end users may interact with the search bar to send search queries to the system. In other instances, a partner 125 may be an end user that directly interfaces with a website or portal provided by the system 105.

In one embodiment, the partners 125 leverage the functionality of the system 105 to provide a customized application search via their websites. A partner 125 may select one or more attribute filters to be applied to queries and particular attributes to be displayed with each search result. The application search system 105 stores the selections from a partner 125 in association with an IP address of the partner system or other identifier of the partner 125. Thus, the application search system 105 processes queries received from the partner system 125 based on the attribute filters and attribute display preferences specified by the partner 125. In one embodiment, attribute filters and attribute display preferences are selected from a list provided by the application search system 105.

The application search system 105 performs searches for applications. In one aspect, the application search system 105 matches search queries to applications based on inferred or derived functional capabilities of the search queries and applications rather than only on explicit matches of the keywords associated with the search queries and applications. In one embodiment, the application search system 105 modifies search results provided to a partner 125 based on attribute preferences defined by the partner 125, thus providing partners 125 with options for customizing search results provided to users of the partners' websites. If a partner 125 selects a filter to be applied to searches received at the partner's website, the application search system 105 filters the search results provided to the partner 125 based on the selected filter. Similarly, if a partner 125 specifies attribute display preferences, the application search system 105 formats the search results based on the preferences.

As shown in FIG. 1, the application search system 105 includes a data processing module 110 and an application search module 115. Some embodiments of the application search system 105 have different and/or other modules than the ones described herein. Similarly, the functions can be distributed among the modules in accordance with other embodiments in a different manner than is described here. Likewise, the functions can be performed by other entities.

Data Processing Module

Figure 2:
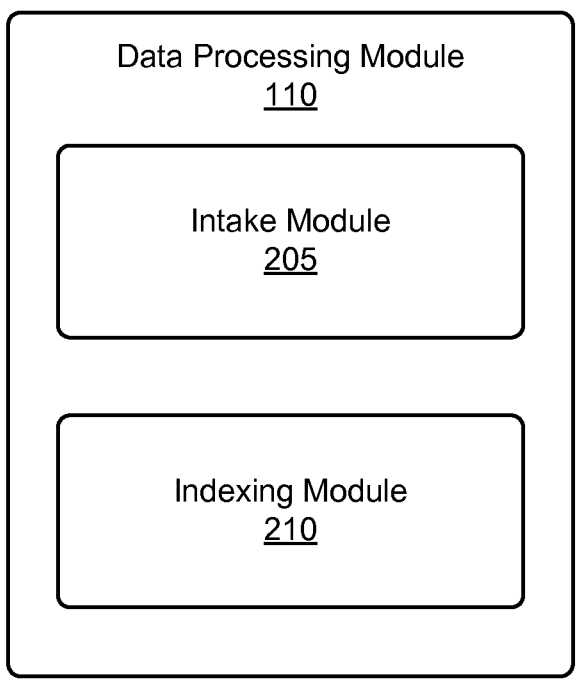
FIG. 2 is an example high-level block diagram illustrating a detailed view of example modules within a data processing module.

FIG. 2 is a high level block diagram illustrating a detailed view of modules within the data processing module 110 according to one embodiment. The modules described in accordance with FIG. 2 are executable by one or more computer systems, e.g., computer system 100. Some embodiments of the data processing module 110 have different and/or other modules than the ones described herein. Similarly, the functions can be distributed among the modules in accordance with other embodiments in a different manner than is described here. Likewise, the functions can be performed by other entities. The data processing module 110 includes modules for performing various functions. These modules include an intake module 205 and an indexing module 210.

The intake module 205 receives data from one or more of the data sources 135. The data may be later used to support application search. In one embodiment, the data received from the data sources 135 may include information about one or more applications. For example, data may be scraped from web pages on the internet using one or more crawlers. In one embodiment, at least some of the data received from the data sources 135 may include information regarding the functionalities of the one or more applications.

The indexing module 210 generates one or more search indexes usable for supporting application search. In order to generate the indexes, the indexing module 210 identifies applications from the data received by the intake module 205, and generates application representation structures for the applications. The indexing module 210 additionally extracts attributes from the gathered data for the identified applications. An attribute may be a particular characteristic that describes a feature of the application. For example, attributes may be icons that represent the application, screenshot images of the application in operation, Application ID, store ID, developer name, publisher name, language, ESRB (Entertainment Software Rating Board) rating, date released, category, size of application, platform information, price, version, short description, security ratings, user reviews, and/or user ratings. At least some of the extracted attributes may relate to functional aspects of the identified applications. In some examples, attributes may be directly received from gathered data, and in other examples, attributes may be generated or inferred based on the gathered data. The attributes may be included in the application representation structures that represent the applications. In another example, indexing module 210 structures the gathered data by extracting data that represents an attribute of an indexed application and places the data in the application representation accordingly.

Based on the application representations, the indexing module 210 generates one or more search indexes for supporting application search and stores the indexes in a computer-readable storage device. For example, the indexing module 210 may generate the search indexes by processing the attributes included in each of the application representations. Each search index may be data structures populated with the application ID corresponding to the application representations of the applications. The search indexes may later be used to perform customizable application searches.

Application Search Module

Figure 3:
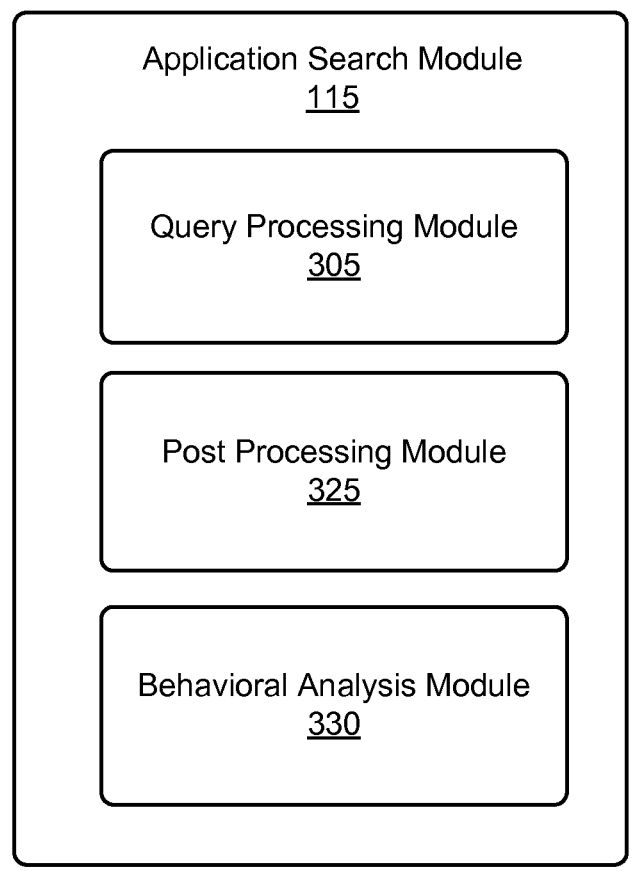
FIG. 3 is an example high-level block diagram illustrating a detailed view of modules within an application search module.

FIG. 3 is a high level block diagram illustrating a detailed view of modules within the application search module 115 according to one embodiment. Some embodiments of the application search module 115 have different and/or other modules than the ones described herein. Similarly, the functions can be distributed among the modules in accordance with other embodiments in a different manner than is described here. Likewise, the functions can be performed by other entities. The application search module 115 includes modules for performing various functions. These modules include a query processing module 305, a post processing module 325, and a behavioral analysis module 330.

The query processing module 305 processes queries received from one or more partners 125. In one embodiment, the query processing module 305 receives an input Q from a partner 125. The input Q may include a search query, an attribute filter, and one or more attribute display preferences specified by a partner 125. In one embodiment, a partner 125 specifies attribute filters and attribute display preferences offline, such that the queries entered through the partner's website are associated with the same filtering and attribute settings. Alternatively, an end user may specify a filter and attribute display preferences at the time the user enters a query via a partner 125. The input Q may also include additional context information for the query, such as platform constraint information, geo-location preferences, partner specific information, etc.

Based on the input Q, the query processing module 305 generates a set of queries. In addition to constructing the set of queries, the query processing module 305 generates a set of query features $F_q$ based on the received search query. A query feature may be any suitable information related to a search query. For example, a query feature may include information indicating a number of words in a search query. Query features can also include information specifying the popularity or frequency of the received search query. Other query features might include inferred concepts or desired categories of the search query, such as a "games" query category.

After processing the query, the query processing module 305 identifies an initial set of applications and a corresponding set of attribute data based on the generated set of queries. Specifically, the query processing module 305 queries one or more indexes generated by the indexing module 210 using the set of queries to identify an initial set of applications and corresponding application representations, which include attributes of the applications, as an initial set of search results for the queries.

Following identification of the initial set of applications, the query processing module 305 determines the application-specific features $F_r$ for the initial set of applications. In one embodiment, the application-specific features $F_r$ for each application in the initial set may include or be based on the attributes of the application and/or the attributes of editions associated with the application representation.

If an attributes filter was specified by a partner 125 or in the input Q, the query processing module 305 filters the initial set of applications based on the attributes of each application and the attributes filter. The query processing module 305 removes applications in the initial results set not meeting the criterion specified by the attributes filter, generating a filtered set of search results. For example, a partner 125 may specify a filter for free applications (that is, to filter the applications based on the price attribute of applications). When a search query (e.g., a query for "word games") associated with the corresponding partner system is received the query processing module 305 may retrieve an initial set of search results matching the "word games" query. After retrieving the initial set of search results, the query processing module 305 may filter the initial search results based on the "free" attribute filter. The filtered set of search results in this case therefore includes applications that are free to download and are determined to match the "word games" query. The query processing module 305 may identify the partner 125 from which a query was received based on a partner identifier or IP address received with the query, and retrieve an attributes filter previously stored for the determined partner 125.

In one embodiment, the query processing module 305 processes the initial or filtered set of applications in order to generate a set of ranked search results. To do so, the query processing module 305 generates a set of query/result features $F_{q/r}$ that indicate the relationships between the set of features $F_r$ of the applications in the initial set and the query features $F_q$. For example, the set of features $F_{q/r}$ may indicate the distances between terms in the search query and terms in the applications' titles.

In one embodiment, the query processing module 305 applies at least the application-specific features $F_r$, the query/result feature $F_{q/r}$, and the query features $F_q$ to a machine learned scoring model. The machine learned scoring model may score the relevance of each application to the search query based on the application-specific features $F_r$, the query/result feature $F_{q/r}$, and the query features $F_q$. Based on the scoring, the query processing module 305 generates a set of search results. The set of search results may include an ordering of applications from the filtered set of applications based on the scores for the applications. The ordering may indicate the determined relevance of the applications to the search query.

The post-processing module 325 processes the search results to generate a final results list. In one embodiment, the post-processing module 325 obtains display-related metadata for the search results, such as application images (e.g., application screenshots), application descriptions, application videos, etc. The post-processing module 325 may organize the search results by restricting the number of results in the list that are from a single developer or platform, clustering the results by concept, or emphasizing specific editions of an application most relevant to the query. Thus, the list of results may be modified from its default sort-by-score order.

The post-processing module 325 may also format the final results list for presentation to an end user. Based on attribute display preferences specified in the input Q or by a partner 125, the post-processing module 325 formats the attributes displayed with each search result. For example, if the attribute display preferences indicate that reviews from a social networking website are to be presented with the search results, the post-processing module 325 retrieves reviews associated with each application in the results list from the social networking site and formats the reviews for presentation with the search results. As another example, if the attribute display preferences indicate that the price of applications are not to be presented with the search results, the post-processing module 325 formats the search results for presentation without the corresponding prices.

The behavior analysis module 330 monitors the actions of the partner that provided the query. For example, the system can determine which applications were eventually viewed or downloaded by the partner, etc. Such information can be analyzed to further extract attributes for the applications. The extracted attributes may be used to later influence the performance of subsequent searches performed by the application search module 115.

Process for Providing Customizable Search

Figure 4:
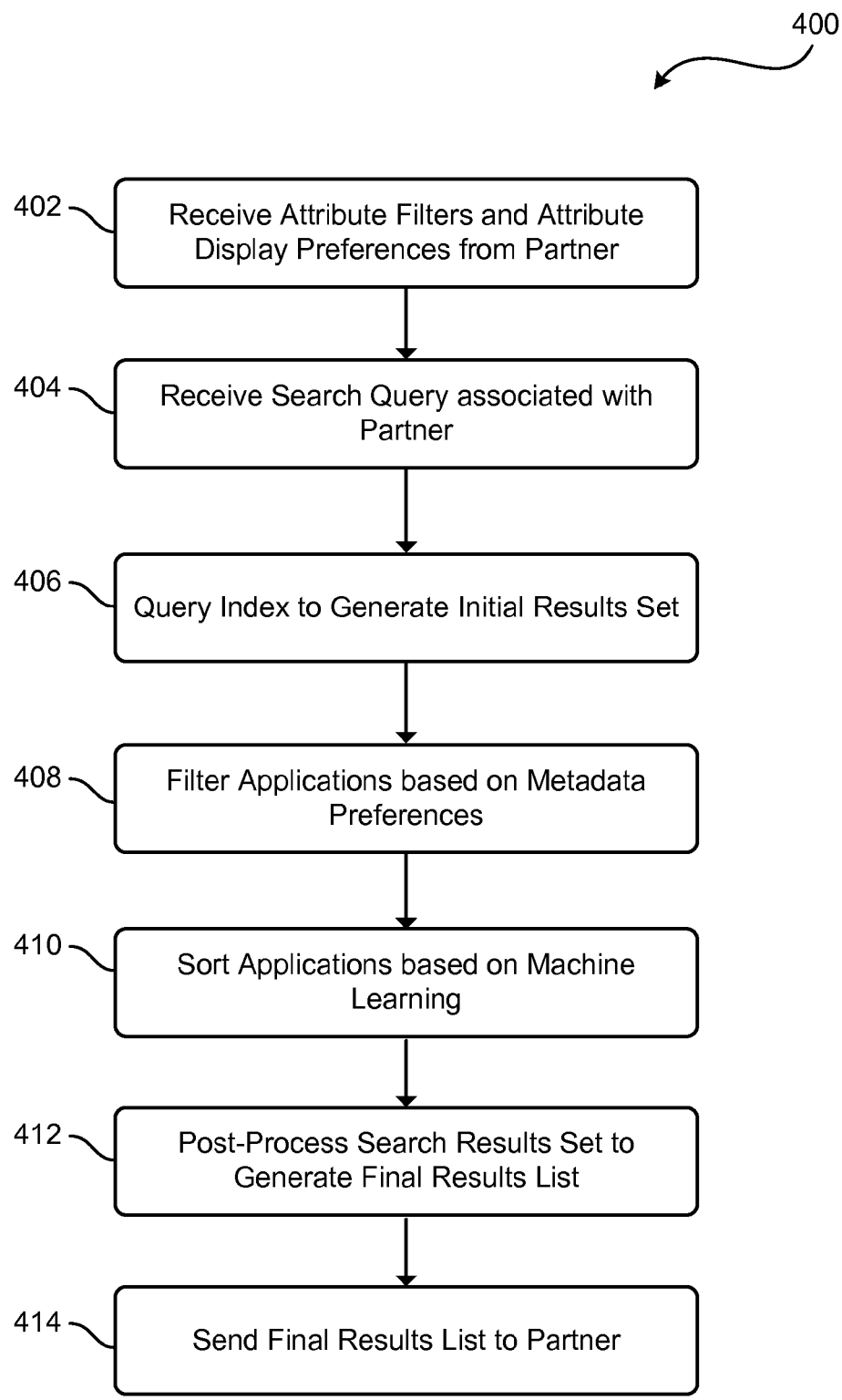
FIG. 4 is a flow chart illustrating an example method for providing customizable application search.

FIG. 4 illustrates a method for providing customizable search, in accordance with an embodiment. Other embodiments can perform the steps of the method in different orders and can include different, additional, and/or fewer steps. The process shown in FIG. 4 can be performed by the application search module 115.

The application search module 115 receives 402 a selection of one or more attribute filters and attribute display preferences from the partner 125. In one embodiment, the application search module 115 stores the partner's selections in association with an identifier of the partner 125, such that queries received from the partner 125 can be automatically associated with the selections. Alternatively, filters may be specified in a query, or attribute display preferences may be specified by an end user interacting with a page of displayed search results. The application search module 115 receives 404 an application search query associated with a partner 125. For example, the application search query may be received 404 from a partner system, or received 404 from a computing device leveraging the functionality of a partner system. The application search module 115 queries 406 one or more indexes to generate an initial set of search results. Based on the attribute filters stored for the partner 125 or specified in the query, the application search module 115 filters 408 the initial results set. In one embodiment, the filtering 408 comprises removing applications from the initial results set based on the attribute preferences. For example, if the query indicated that only applications having a security rating above a given threshold are to be included in the final results set, the application search module 115 removes any applications in the initial results set not meeting the criterion.

The application search module 115 sorts 410 the application search results set based on machine learning, and processes 412 the search results set to generate a final results list. In one embodiment, processing 412 comprises selecting attributes to display with the search results based on the attribute display preferences stored for the partner 125. For example, if attribute display preferences indicating that prices of the applications are not to be displayed with the search results, the application search module 115 generates a list of search results to be displayed on a client device without the prices of the applications. The application search module 115 sends 414 the final results list to the partner 125 for display to an end user.

Figure 5:
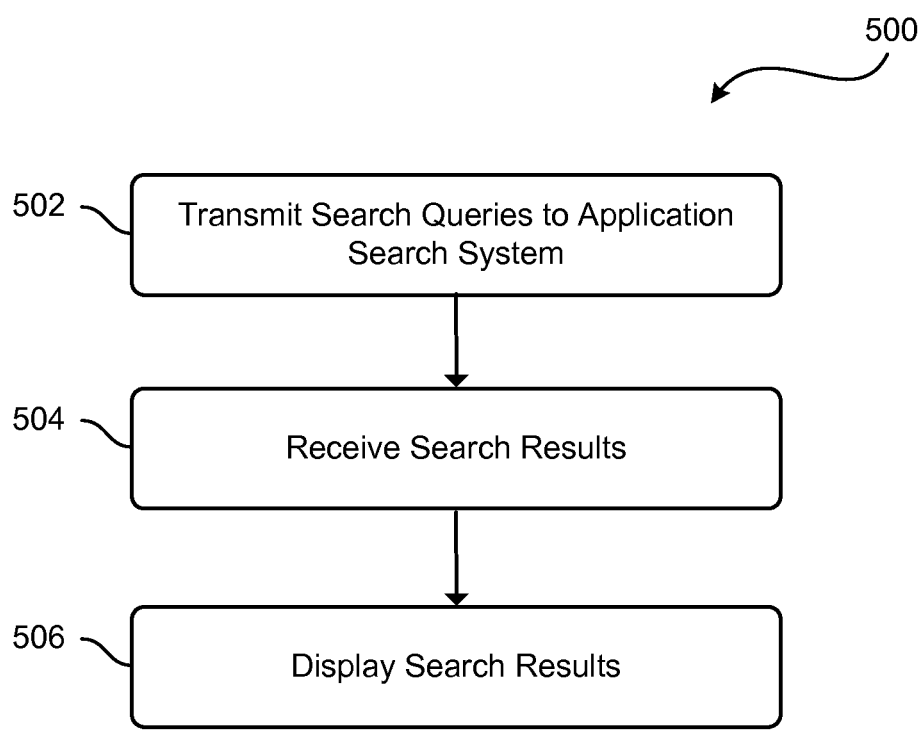
FIG. 5 is a flow chart illustrating an example method for customizing application search.

FIG. 5 illustrates a method for customizing application search results, in accordance with an embodiment. Other embodiments can perform the steps of the method in different orders and can include different, additional, and/or fewer steps. The process shown in FIG. 5 can be performed by a user device, such as a partner system associated with a partner 125.

The user device transmits 502 a query to the application search system 105. In one embodiment, the user device transmits 502 the query via a partner 125 associated with the user device. An attributes filter and/or attribute display preferences may be specified in the query or previously stored by the application search system 105 for the partner 125. The user device receives 504 a set of search results from the application search system 105 determined based on the query and the attributes filter. The user device displays 506 the search results. In one embodiment, the user device displays 506 the application representations in the set of search results with attributes associated with each application representation. The attributes displayed with each search result may be modified based on the attribute display preferences specified in the query or by the partner 125.

The embodiments described herein beneficially allow application search systems to provide customizable searches. By querying an index corresponding to an application category selected by a partner, filtering the set of application representations retrieved from the index based on an attribute filter, and modifying the set of attributes displayed with the search results based on attribute display preferences, an application search system as described herein returns search results customized according to the preferences of end users. As an example, a mobile network operator (MNO) may select a category filter for applications compatible with the MNO's platform. When its customers enter queries into the search engine provided by MNO, the application search system 105 filters the search results to include only applications that are compatible with the MNO's platform. Thus, the customers are provided with more relevant search results than if they needed to manually review each application for compatibility with the platform. As another example, a children's entertainment company may set a category filter for games and attribute filters for high security and low violence to provide its users with a list of children's games. The children's entertainment company may also specify that reviews from a particular domain are not to be displayed with the search results. Accordingly, users of the search engine provided by the children's entertainment company do not need to manually review each search result to determine if it is a game suitable for children.

Computing Machine Architecture

Figure 6:
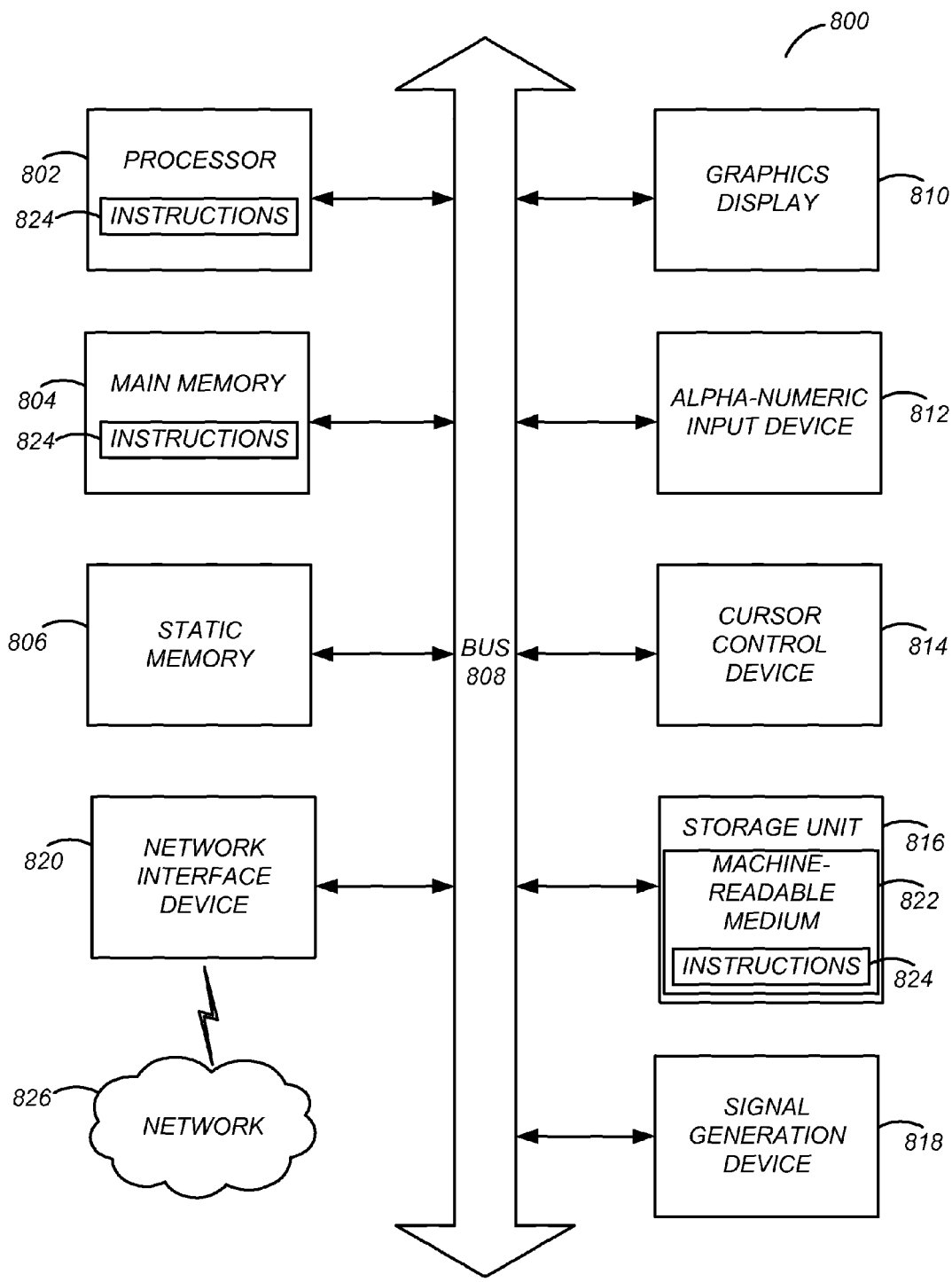
FIG. 6 illustrates components of an example machine able to read instructions from a machine-readable medium and execute the instructions in a processor (or controller).

FIG. 6 is a block diagram illustrating components of an example machine able to read instructions from a machine-readable medium and execute them in a processor (or controller), as an example of the search system 105, partners 125, or client devices. Specifically, FIG. 6 shows a diagrammatic representation of a machine in the example form of a computer system 600 within which instructions 624 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 624 (sequential or otherwise) that specify actions to be taken by that machine. Further, while only a single machine is illustrated, the term "machine" shall also be taken to include any collection of machines that individually or jointly execute instructions 624 to perform any one or more of the methodologies discussed herein.

The example computer system 600 includes one or more processors 602 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 604, and a static memory 606, which are configured to communicate with each other via a bus 608. The computer system 600 may further include graphics display unit 610 (e.g., a plasma display panel (PDP), a liquid crystal display (LCD), a projector, or a cathode ray tube (CRT)). The computer system 600 may also include alphanumeric input device 612 (e.g., a keyboard), a cursor control device 614 (e.g., a mouse, a trackball, a joystick, a motion sensor, or other pointing instrument), a storage unit 616, a signal generation device 618 (e.g., a speaker), and a network interface device 620, which also are configured to communicate via the bus 608.

The storage unit 616 includes a machine-readable medium 622 on which is stored instructions 624 (e.g., software) embodying any one or more of the methodologies or functions described herein. The instructions 624 (e.g., software) may also reside, completely or at least partially, within the main memory 604 or within the processor 602 (e.g., within a processor's cache memory) during execution thereof by the computer system 600, the main memory 604 and the processor 602 also constituting machine-readable media. The instructions 624 (e.g., software) may be transmitted or received over a network 626 via the network interface device 620.

While machine-readable medium 622 is shown in an example embodiment to be a single medium, the term "machine-readable medium" should be taken to include a single medium or multiple media (e.g., a centralized or distributed database, or associated caches and servers) able to store instructions (e.g., instructions 624). The term "machine-readable medium" shall also be taken to include any medium that is capable of storing instructions (e.g., instructions 624) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 1-3. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors, e.g., processor 602) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA), an application-specific integrated circuit (ASIC), system on a chip (SoC), chipset) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 602, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for providing customizable search through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method comprising:
by an application search system, storing, in a storage unit, a plurality of application representations corresponding to a plurality of applications from one or more data sources accessed by the application search system,
wherein each application representation includes a set of application attributes of a corresponding application of the plurality of applications obtained from a corresponding data source of the one or more data sources, and
wherein each data source of the one or more data sources is distinct from the application search system;
by the application search system, storing, in the storage unit, one or more search indexes indexing the plurality of application representations;
by the application search system, storing, in the storage unit, a plurality of attribute filters specified by a plurality of third-party partners distinct from the application search system,
wherein each attribute filter (i) corresponds to a respective partner of the plurality of third-party partners and (ii) includes one or more attribute-specific criteria on filtering one or more of the plurality of application representations,
wherein the attribute-specific criteria defines criteria on whether to include a particular application representation from an identified set of application representations based on one or more of the application attributes defined in the particular application representation;
by the application search system, storing, in the storage unit, a plurality of attribute display preference sets specified by the plurality of third-party partners,
wherein each attribute display preference set (i) corresponds to a respective partner of the plurality of third-party partners and (ii) includes a set of display attributes defined by the respective partner specifying displaying format of one or more of the plurality of application representations in a results page generated with respect to the respective partner;
receiving, by the application search system: (i) an identifier of a specific partner of the plurality of third-party partners; partners and (ii) an application search query from a user device,
wherein the application search query is received from the user device via the specific partner and the specific partner is distinct from the application search system, the user device, and a user of the user device;
by the application search system, responsive to receiving the application search query, identifying one or more application representations from the plurality of application representations by querying the one or more search indexes based on the application search query;
by the application search system, based on the identifier of the specific partner, retrieving an attribute filter corresponding to the specific partner from the plurality of attribute filters;
by the application search system, obtaining a set of filtered application representations that satisfy the one or more criteria defined in the retrieved attribute filter by filtering the one or more application representations with the retrieved attribute filter;
by the application search system, based on the identifier of the specific partner, retrieving an attribute display preference set corresponding to the specific partner from the plurality of attribute display preference sets;
by the application search system, generating search results based on the set of filtered application representations and the retrieved attribute display preference set; and
by the application search system, providing the search results to the user device via the specific partner.

2. The method of claim 1, wherein generating the search results includes formatting individual ones of the search results based on the retrieved attribute display preference set.

3. The method of claim 1, further comprising:
ranking the application representations in the set of filtered application representations based on a machine learned scoring model and the application attributes associated with the application representations in the set of filtered application representations.

4. The method of claim 1, wherein the data source includes at least one of an application store, an application catalog, a blog, and an application review site.

5. An application search system comprising:
one or more processors; and
a non-transitory computer-readable storage medium storing computer program instructions executed by the one or more processors to perform a method, the method comprising:
storing, in a storage unit, a plurality of application representations corresponding to a plurality of applications from one or more data sources accessed by the application search system,
wherein each application representation includes a set of application attributes of a corresponding application of the plurality of applications obtained from a corresponding data source of the one or more data sources, and
wherein each data source of the one or more data sources is distinct from the application search system;
storing, in the storage unit, one or more search indexes indexing the plurality of application representations;
storing, in the storage unit, a plurality of attribute filters specified by a plurality of third-party partners distinct from the application search system,
wherein each attribute filter (i) corresponds to a respective partner of the plurality of third-party partners and (ii) includes one or more attribute-specific criteria on filtering one or more of the plurality of application representations,
wherein the attribute-specific criteria defines criteria on whether to include a particular application representation from an identified set of application representations based on one or more of the application attributes defined in the particular application representation;
storing, in the storage unit, a plurality of attribute display preference sets specified by the plurality of third-party partners,
wherein each attribute display preference set (i) corresponds to a respective partner of the plurality of third-party partners and (ii) includes a set of display attributes defined by the respective partner specifying displaying format of one or more of the plurality of application representations in a results page generated in accordance with the respective partner;
receiving (i) an identifier of a specific partner of the plurality of third-party partners and (ii) an application search query from a user device via the specific partner, wherein the specific partner is distinct from the application search system, the user device, and a user of the user device;
responsive to receiving the application search query, identifying one or more application representations from the plurality of application representations by querying the one or more search indexes based on the application search query;
based on the identifier of the specific partner, retrieving an attribute filter corresponding to the specific partner from the plurality of attribute filters;
obtaining a set of filtered application representations that satisfy the one or more criteria defined in the retrieved attribute filter by filtering the one or more application representations with the retrieved attribute filter;
based on the identifier of the specific partner, retrieving an attribute display preference set corresponding to the specific partner from the plurality of attribute display preference sets;
generating search results based on the set of filtered application representations and the retrieved attribute display preference set; and
providing the search results to the user device via the specific partner.

6. The application search system of claim 5, wherein generating the search results includes formatting individual ones of the search results based on the retrieved attribute display preference set.

7. The application search system of claim 5, wherein the method further comprises:
ranking the application representations in the set of filtered application representations based on a machine learned scoring model and the application attributes associated with the application representations in the set of filtered application representations.

8. The application search system of claim 5, wherein the data source includes at least one of an application store, an application catalog, a blog, and an application review site.

* * * * *